(No Model.)
T. LEWTY.
ELASTIC TREAD HORSESHOE.
No. 558,455. Patented Apr. 14, 1896.
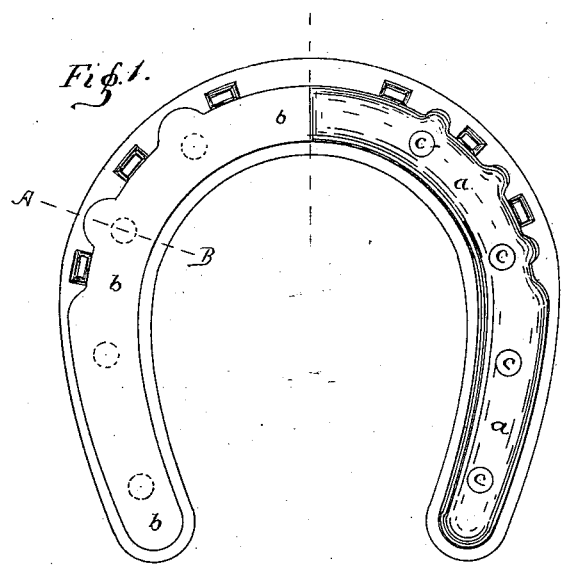
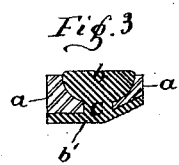
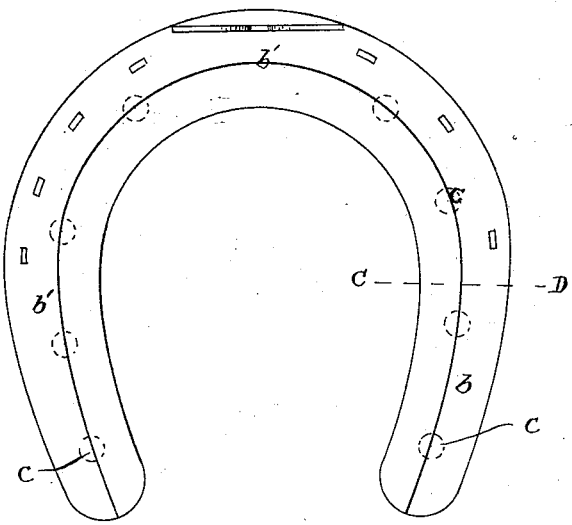
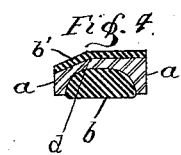
Witnesses
G. C. Conner
Vienna Purdy
Inventor,
Thomas Lewty,
By Attorney, V. H. Lockwood.

UNITED STATES PATENT OFFICE.

THOMAS LEWTY, OF MANCHESTER, ENGLAND, ASSIGNOR TO HIRAM H. GIBBS, OF INDIANAPOLIS, INDIANA.

ELASTIC-TREAD HORSESHOE.

SPECIFICATION forming part of Letters Patent No. 558,455, dated April 14, 1896.

Application filed June 12, 1895. Serial No. 552,606. (No model.) Patented in England August 1, 1890, No. 12,038, and in France May 28, 1891, No. 213,748.

*To all whom it may concern:*

Be it known that I, THOMAS LEWTY, of 215 Stockport Road, Manchester, in the county of Lancaster, England, have invented a certain new and useful Elastic-Tread Horseshoe and Method of Making Same; and I do hereby declare that the following is a full, clear, and exact description thereof, reference being had to the accompanying drawings, in which like letters refer to like parts.

This invention was patented to me in Great Britain, August 1, 1890, No. 12,038, and in France, May 28, 1891, No. 213,748.

The object of this invention is to secure india-rubber or similar material or composition to metal shoes for horses or other animals in such a manner that it shall be practically inseparable therefrom, will prevent the horse or other animal from slipping, and will lessen the danger of injury to the legs of the animal by concussion against stony roads.

The nature of my invention and the manner in which the same is to be performed or carried into practical effect will be readily understood on reference to the sheet of drawings hereunto annexed and to the following explanation thereof.

Figure 1 on the drawings represents a face view of a horseshoe, illustrating my improved mode of securing india-rubber or composition thereto, the right-hand half showing the metal shoe before the india-rubber or composition is applied thereto and the left-hand half the finished article. Fig. 2 is a back or inside view of the same. Fig. 3 is a transverse section through about the line A B of Fig. 1, and Fig. 4 is a section on the line C D of Fig. 2.

For the purposes of my invention I cast, forge, or stamp the metal shoe with a recess $a$ upon the face to receive the india-rubber or composition $b$, such recess extending, say, about two-thirds through the metal, either all around, as shown at Figs. 1 and 3, or in some parts thereof only, so as not to weaken the shoe too much, but so as to leave in all cases a backing of metal and a rim all around, preferably as shown at Fig. 1. At suitable intervals in the recess $a$ openings $c$ are made entirely through the metal. I then apply the india-rubber or composition $b$ in such a way as to fill the recess or recesses, pass through the openings $c$, and extend all over the surface of the back of the shoe, as shown at $b'$, Figs. 2 and 3.

The india-rubber or composition $b$ held in the recess $a$ is therefore firmly united to the coating $b'$, which covers the back by the connecting webs or pieces of rubber or composition which pass through the openings $c$, as shown at Fig. 3, and the india-rubber or composition is held firmly in its place and cannot be detached from the shoe. The back of the metal shoe is so formed as to provide a ridge or recess at $d$, preferably all around the shoe, whereby the lateral play or movement of the rubber cushion between the hoof and the shoe is prevented.

If preferred, the india-rubber may be further secured by cement or by vulcanizing onto the metal, and the inner coating may have cemented to it or embedded in it a piece of coarse canvas or other material, which will prevent the lateral spreading of the india-rubber in use.

In consequence of the elasticity of the india-rubber or other similar substance or composition the surface of the metal will always wear away quicker than the rubber or composition itself, so that the surface of the latter will project slightly, as shown at Fig. 3, and this will not only prevent the animal from slipping, but also, in conjunction with the india-rubber $b'$ at the back, (between the shoe and the hoof,) will deaden or absorb all shock due to the concussion of the shoe against the hard surface of the road, and thus prevent injury to the hoof and also to the joints, sinews, bones, and nerves of the legs of the animal.

Having now particularly described and ascertained the nature of my said invention and in what manner the same is to be performed, I declare that what I claim is—

1. An elastic-tread horseshoe comprising a metal frame recessed in the face thereof and provided with apertures, a rubber cushion seated in such recess, and also a rubber cushion over the back of the shoe, the two cushions being connected through such apertures whereby the two cushions will hold each other in place, substantially as shown and described.

2. An elastic-tread horseshoe comprising a metal frame recessed in the face thereof from one end to the other and provided with apertures, a continuous rubber cushion seated in such recess, a continuous rubber cushion over the back of the shoe extending from one end to the other, and rubber necks through the apertures connecting the two cushions, the cushions and necks being integral, substantially as set forth.

3. An elastic-tread horseshoe comprising a metal frame and a rubber cushion on the back thereof between the frame and the hoof, the back of such frame being provided with means for preventing lateral movement of the rubber cushion when in place, substantially as set forth.

In witness whereof I have hereunto set my hand this 19th day of March, 1895.

THOS. LEWTY.

Witnesses:
I. OWDEN O'BRIEN,
CHAS. OVENDALE.